United States Patent [19]

Chase

[11] Patent Number: 4,544,028

[45] Date of Patent: Oct. 1, 1985

[54] HEAT ACCUMULATOR

[75] Inventor: David W. Chase, San Jose, Calif.

[73] Assignee: C. Mitchell Bedford, Monterey, Calif.

[21] Appl. No.: 486,655

[22] Filed: Apr. 20, 1983

[51] Int. Cl.$^4$ .......................... F28D 13/00; F24H 7/00
[52] U.S. Cl. ............................... 165/104.14; 126/400; 165/DIG. 4; 165/104.15
[58] Field of Search ............................. 126/400, 436; 165/104.11, DIG. 4, 10 A, 104.14, 104.15, 104.17

[56] References Cited

U.S. PATENT DOCUMENTS

| | | | |
|---|---|---|---|
| 3,596,713 | 8/1971 | Katz | 126/400 |
| 3,773,031 | 11/1973 | Laing | 126/400 |
| 4,111,189 | 9/1978 | Dizon | 126/400 |
| 4,182,409 | 1/1980 | Robinson | 126/400 |

FOREIGN PATENT DOCUMENTS

| | | | |
|---|---|---|---|
| 2552698 | 6/1977 | Fed. Rep. of Germany | 126/436 |
| 2741829 | 3/1979 | Fed. Rep. of Germany | 126/436 |

*Primary Examiner*—Samuel Scott
*Assistant Examiner*—G. Anderson
*Attorney, Agent, or Firm*—Townsend & Townsend

[57] ABSTRACT

A heat-storage apparatus providing for especially efficient charging and discharging of a storage medium with heat and greatly facilitating simultaneous charging and discharging of different regions of the medium. The apparatus comprises a vessel having insulating walls and containing a heat transfer fluid bath and a plurality of mobile heat storage elements, each of which contains a phase change material for the storage of heat, and which are disposed within the fluid bath in a sufficiently loose configuration to allow heat-storage elements to migrate about the vessel. A charging conduit and a discharge conduit are disposed within the vessel in the fluid bath so as to induce a migratory circulation of heat-storage elements between regions where elements are being charged and regions where elements are discharged.

6 Claims, 2 Drawing Figures

HEAT ACCUMULATOR

BACKGROUND OF THE INVENTION

The present invention relates to heat-storage devices such as used in solar heating systems for retaining a quantity of heat for use at a later time.

A typical heat-storage device includes a heat-storage material and means for transferring heat to and withdrawing heat from the heat-storage material. In some devices the heat-storage material is provided by a large tank of water or a collection of solid heat-absorbing bodies such as rocks. In this type of device the temperature of the heat storage material rises as the material absorbs more and more heat. In other devices the heat-storage material is provided, for example, by chemical salts, which are capable of undergoing a phase transition between a state in solution and a crystalline state, in which a characteristic latent heat of transition is absorbed or given up during the transition with no accompanying change of temperature.

It is a goal of any practical heat-storage system to store a large quantity of heat in a compact volume and to provide rapid access to the stored heat upon demand. Devices utilizing phase-change materials for heat storage have shown some promise in achieving efficient heat storage.

For example, one such device is disclosed in U.S. Patent No. 4,111,189. In that device a heat-exchange fluid passes through a coiled conduit which is embedded in a matrix of phase-change material. Transfer of heat between the heat-exchange fluid and the phase-change material occurs through the surface of the conduit, which is stationarily fixed within the phase change matrix.

German Offenlegungsschrift No. 25 52 698 discloses another heat-storage system in which a large number of hollow heat-storage balls are packed in a regular array within an insulated container. The balls contain a phase-change material for the storage of heat. A pipeline system runs through the array in a regular pattern making direct contact with all of the balls of the array. Heat transfer with the phase-change material within the balls is effected by means of a heat exchange fluid which is pumped through the pipeline system.

U.S. Patent No. 3,773,031 discloses a similar system in which the large number of balls are disposed within the insulated container in close-packed configuration and immersed in a heat-transfer bath. The spaces between the balls, which are stationarily fixed in their close-packed configuration, effectively define convection ducts through which the heated bath will rise and circulate to deliver heat to the phase-change material within the spherical balls.

In all of these heat storage devices the exchange of heat is impeded by the fact that the heat-storage medium will become fully charged in a localized region in the vicinity of the heat-transfer means. The heat then must follow a secondary exchange path, requiring a greater heat exchange time, to reach the regions of heat-storage medium removed from the immediate vicinity of the heat transfer means.

SUMMARY OF THE INVENTION

The present invention provides a heat-storage apparatus which demonstrates an especially efficient heat transfer into and out of the heat-storage medium and which allows heat to accumulate in some regions of the heat-storage medium while being withdrawn from other regions of the heat-storage medium. Briefly, the apparatus comprises a vessel having insulating walls, which contains a heat-transfer fluid bath and a plurality of mobile heat-storage elements, each of which contains a phase change material for the storage of heat, the plurality of elements being disposed within the fluid bath in sufficiently loose configuration to allow heat-storage elements to migrate about the vessel. A heat exchange means is disposed within the fluid bath for exchange of heat therewith. Arranged in loose configuration, the heat storage elements are free to migrate between hotter and cooler regions of the heat-transfer fluid bath, thereby providing more effective heat transfer with the phase-change material contained within the heat-storage materials. As another advantage, the migration of heat-storage elements produces a continual mixing of the phase-change material to provide more reliable crystallization.

In the preferred embodiment the heat exchange means comprises a charging conduit and a discharge conduit for conducting a service fluid through the heat-transfer fluid bath. With separate charging and discharge conduits heat may be extracted from one region of the apparatus while it is delivered to another region. In this embodiment the charging and discharge conduits are spaced apart from one another whereby a circulation of heat-storage elements is induced between the hotter and cooler regions surrounding the charging and discharge conduits.

A further understanding and appreciation of the nature and advantages of the invention may be gained by reference to the remaining portion of the specification and to the attached drawings.

DETAILED DESCRIPTION OF THE PREFERRED EMBODIMENT

Figures 1, 2:
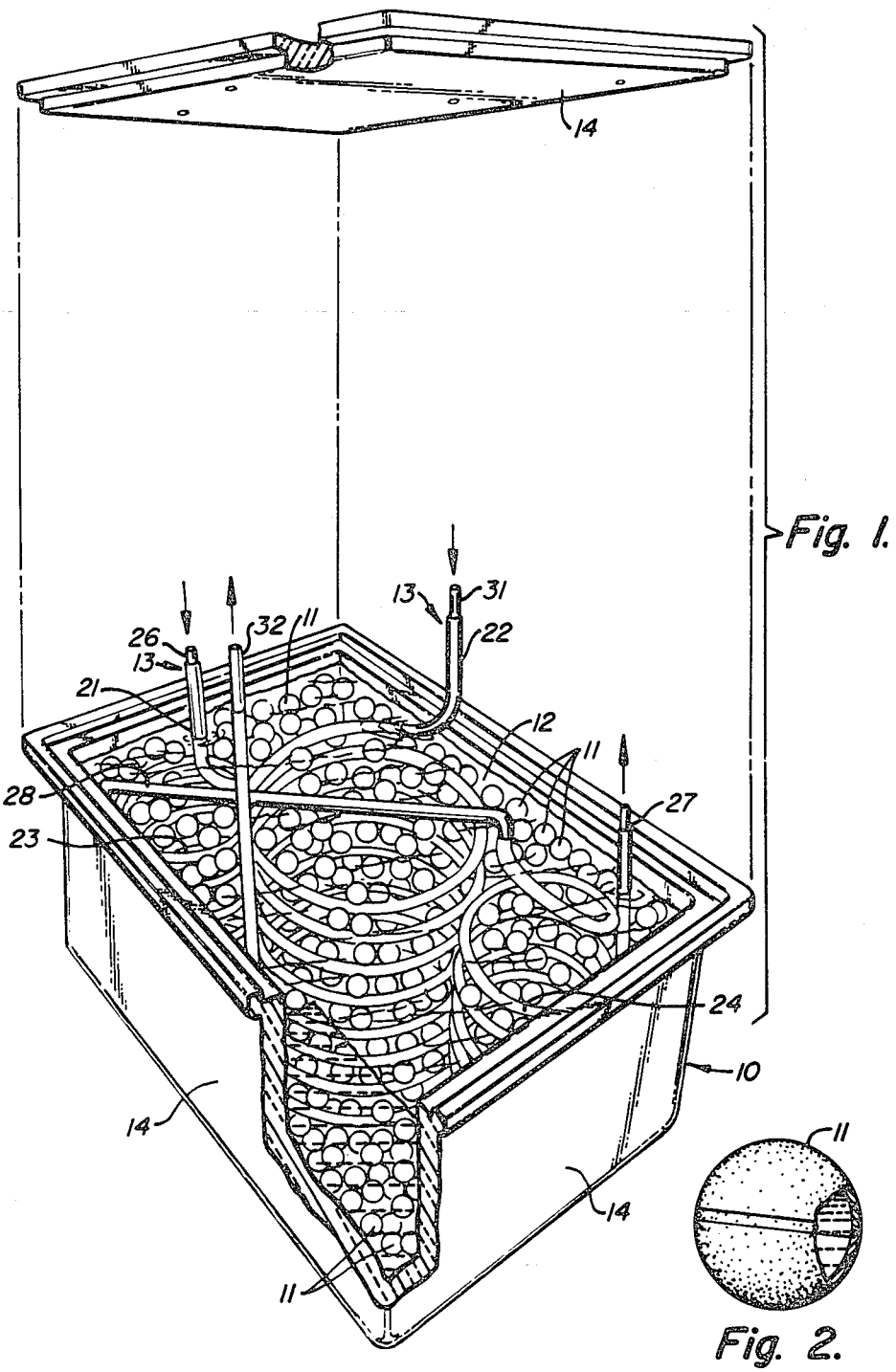
FIG. 1 is a cut-away exploded perspective view of a heat-storage apparatus constructed in accordance with the invention.
FIG. 2 is a cut-away elevational view of an individual heat-storage element.

With reference to FIG. 1, the heat-storage apparatus of the present invention comprises a vessel 10, a plurality of heat-storage elements 11 immersed in a heat-transfer fluid bath 12 contained in the vessel 10, and means for heat exchange with the heat-transfer bath 12. The heat exchange means is generally designated by reference numeral 13. For reasons which will be appreciated more fully hereinbelow, the plurality of heat storage elements 11 are disposed in loose-packed configuration within the heat transfer bath 12.

The vessel 10 is enclosed on all sides by insulating walls 14. Suitable materials for the construction of insulating walls 14 are well known to those skilled in the art.

The heat-storage elements 11 contain a phase-change material such as a salt hydrate; a hydrate of $CaCl_2$ with an admixture of impurity, for example, a borate or silica, to provide a nucleation basis for crystallization has been found suitable for this purpose, and other phase-change materials will readily occur to those skilled in the art. It is characteristic of the invention that heat-storage elements 11, containing the phase change material, have essentially zero buoyancy when immersed in heat-transfer bath 12. As is well known, the buoyancy of heat-storage elements 11 depends on the relative density of an element 11 with respect to the density of the heat-transfer bath 12. Those skilled in the art will readily be able to fabricate heat-storage elements 11 with the requisite density.

Heat-exchange means 13 preferably comprises at least one conduit formed, for example, by a length of copper tubing which extends in a coil or serpentine configuration through the heat-transfer bath 12. In the best mode for practicing the invention the heat-exchange means 13 comprises a first conduit 21 for charging the system with heat and a second conduit 22 for discharge of heat from the system. Charging conduit 21 includes portions 23 and 24 which are formed in vertically extending coils disposed in diagonally opposed corners of the vessel 10. Discharge conduit 22 is preferably formed with a single coiled portion larger than the charging coiled portions 23 and 24 and disposed centrally within the vessel 10 between the charging coil portions 23 and 24. For the best operation of the invention, successive turns of the coiled portions of conduits 21 and 22 should be spread apart a distance larger than the longest dimension of heat-storage elements 11, so that an individual heat-storage element 11 is able to pass through the sides of the coiled portions back and forth between the interior and exterior regions thereof.

Charging conduit 21 is provided with an inlet 26 proximate the top of the first vertically extending coiled portion 23 and an outlet 27 communicating directly with the bottom of the second coiled portion 24. The two coiled portions 23 and 24 are connected by cross conduit 28, which extends horizontally in the upper portion of heat-transfer bath 12. Discharge conduit 22 includes an inlet 31 leading to the top of the discharge conduit coiled portion and an outlet 32 communicating directly with the bottom of the discharge conduit coiled portion. The inlets and outlets 26, 27, 31, and 32 extend through the top wall of vessel 10 and are adapted for connection to a heat source and heat sink as dictated by the system with which the heat-storage apparatus is to be used.

It is a characteristic of the invention that the individual heat-storage elements 11 be free to migrate about vessel 10. To allow such migration, it is necessary that fewer heat-storage elements be disposed within vessel 10 than could be used, say, if they were disposed in the close-packed configurations of U.S. Patent No. 4,111,189 or of German Offenlegungsschrift No. 25 52 698. While it would ordinarily appear less desirable to use fewer heat-storage elements, hence, less phase-change material for storing heat, it is found in the present invention to be well worth the tradeoff. The mobile nature of the heat-storage elements achieved by sacrificing a small amount of phase-change material leads to greatly enhanced ability to accumulate heat and extract heat from the storage elements.

To facilitate the ability to migrate, the heat-storage elements 11 are preferably formed in a generally spherical shape. The use of a large number of heat-storage elements 11, each having a relatively small size, also has the advantage that the plurality of heat-storage elements 11 exposes a comparatively large surface area to the heat-transfer bath 12 for a given volume of phase-change material disposed within vessel 10. The greater surface area facilitates heat exchange between the heat-transfer bath 12 and the phase change material within the heat storage elements 11.

In operation, a first service fluid charged with heat from a heat source, for example, a solar panel, enters the apparatus through inlet 26 of charging conduit 21. The service fluid continues downward through the first coiled portion 23 to the bottom of vessel 10, whence it continues upward and through cross conduit 28 to the upper stage of coiled portion 24. The service fluid travels through this coiled portion from top to bottom and then exits the apparatus through outlet 27 and returns to the solar panel to be recharged. A second service fluid for the extraction of heat enters discharge conduit 22 through inlet 31 and travels from top to bottom through the coiled portion and exits through outlet 32. It has been found that the direction of flow through the coiled portions from top to bottom produces more effective heat transfer from the first service fluid in charging conduit 21 to bath 12 and from bath 12 to the second service fluid in discharge conduit 22.

In the first instance the heat is transferred from the service fluid of charging conduit 21 to the bath 12, and then to the phase-change material within the heat-storage elements 11. The elements in the vicinity of the charging coiled portions 23 and 24 will be charged first. Because the material in the heat-storage elements 11 stores heat primarily in the latent heat of transition, as a practical matter the charging service fluid need be at a temperature only slightly greater than that of the phase-change material itself within the heat-storage elements for effective heat transfer. The discharge service fluid in conduit 22 will initially withdraw heat from those heat-storage elements in the vicinity of the conduit 22. As heat is extracted from the storage elements in the vicinity of the discharge conduit 22 and as heat is simultaneously supplied to the storage elements in the vicinity of the charging conduit 21, storage elements in the vicinity of the coiled portions 23 and 24 will tend to migrate toward the discharge conduit 22, and vice versa. The result is a slow circumferential circulation of heat-storage elements 11, which carries fully charged storage elements to the vicinity of the discharge conduit for discharging and partially or fully discharged storage elements to the vicinity of the charging conduit 21 for recharging. In addition, as discharge service fluid is circulated through discharge conduit 22, there will be established a vertical temperature gradient in the vicinity of the conduit 22. A slow secondary circulation of heat-storage elements will occur in the vertical direction primarily within the internal region of the coiled portion of discharge conduit 22.

The primary effect of the induced circulations, in particular, of the circumferential circulation, is to bring the heat-storage elements to the location where they are needed the most. A secondary effect is to continually stir up and mix the phase-change material within the individual heat storage elements. The continual mixing prevents the phase-change material from becoming frozen in one state or another, thereby providing a greater lifetime of the individual storage elements and a greater dependability of the heat-storage apparatus as a whole. Mixing of the phase-change material brought about by the characteristic mobility of the heat-storage elements also facilitates more complete change of phase of the material within each of the elements 11. That is, the mixing facilitates the full capability of the phase-change material to store heat.

In summary, the invention provides a heat-storage apparatus in which the heat is stored in a large number of comparatively small, mobile, heat-storage elements.

By its construction the apparatus induces a slow circulation of the individual heat-storage elements, which serves to equilibrate local regions of fully charged and partially charged heat-storage elements. The circulation of heat-storage elements and the induced mixing of phase-change material allow for much faster utilization of the full heat-storage capacity of a given quantity of phase-change material than has been possible in the past and greatly facilitates the simultaneous charging and discharging of heat to and from different regions of the apparatus.

While the above provides a full and complete disclosure of the preferred embodiment of the present invention, various modifications, alternate constructions, and equivalents may be employed with departing from the true spirit and scope of the invention. For example, given the benefit of this disclosure, vessels of other shapes and other arrangements of heat exchange means for inducing circulation of heat-storage elements will occur to those of ordinary skill in the art. Moreover, although the invention has been illustrated and described herein in terms of a heat-storage apparatus, ordinary artisans will readily appreciate that the apparatus can also be utilized in connection with refrigeration systems for extracting heat from a service fluid rather than for supplying heat to a service fluid as described above.

Therefore, the above description and illustration should not be construed as limiting the scope of the invention, which is defined by the appended claims.

What is claimed is:

1. A heat storage apparatus comprising:
   a vessel having insulating walls and containing a heat-transfer fluid bath;
   a plurality of mobile heat-storage elements containing a phase-change material, each said heat-storage element having substantially zero buoyancy in said fluid bath, said plurality of heat-storage elements being disposed within said fluid bath in sufficiently loose configuration to allow said heat-storage elements to migrate about said vessel; and
   a charging conduit and a discharge conduit for conducting fluid through said heat-transfer fluid bath, said conduits being spaced apart from one another within said fluid bath, whereby said heat-storage elements are free to migrate between hotter and cooler regions of said heat-transfer fluid bath for the transfer of heat therewith.

2. The heat storage apparatus of claim 1, wherein said heat-storage elements are of generally spherical shape so as to maximize the quantity of phase-change material contained therein and to facilitate migration in said heat-transfer fluid bath.

3. The heat-storage apparatus of claim 1, wherein said charging conduit and said discharge conduit have portions formed in vertically extending coil configurations so as to enhance convective circulation of said heat-storage elements between upper and lower ends of said coil portions in response to a vertical temperature gradient across said coil portions produced by hotter or colder fluid circulating there-through.

4. The heat-storage apparatus of claim 3, wherein said charging conduit has two vertically extending coil portions disposed on opposite sides of the coil portion of said discharge conduit.

5. The heat-storage apparatus of claim 3, wherein successive turns of said coil configurations are spread apart a distance greater than the longest dimension of said heat-storage elements so as to enable said elements to migrate into and out of the interior region of said coil portions.

6. A heat-storage apparatus comprising:
   a vessel having insulating walls and containing a heat-transfer fluid bath;
   a plurality of heat-storage elements, each element comprising a hollow container of generally spherical shape containing a phase-change material, said heat-storage elements having substantially zero buoyancy in said fluid bath;
   a charging conduit having a first vertically extending coil portion proximate a first wall of said vessel and a second vertically extending coil portion proximate a second wall of said vessel opposite said first wall, successive turns of said coil portions being spread apart a distance greater than the diameter of said generally spherical container; and
   a discharge conduit having a vertically extending coil portion disposed between the first and second coil portions of said charging conduit;
   wherein said plurality of heat-storage elements are disposed within said heat-transfer fluid bath sufficiently loosely to allow said heat-storage elements to migrate about said vessel in response to thermally induced convective circulation in said heat-transfer fluid bath.

* * * * *